No. 881,022. PATENTED MAR. 3, 1908.
R. F. NAILLER.
PIPE COUPLING.
APPLICATION FILED JULY 10, 1907.
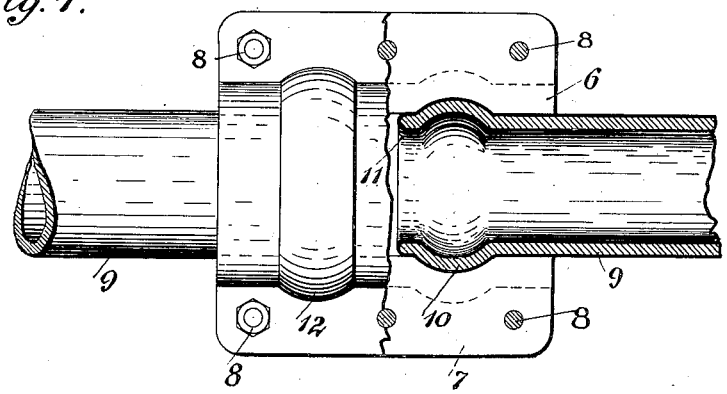
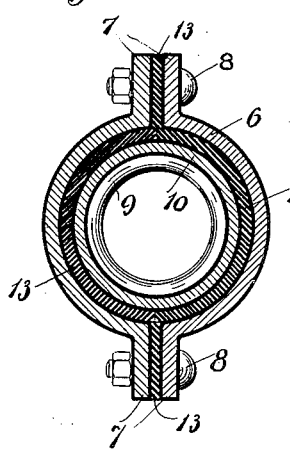
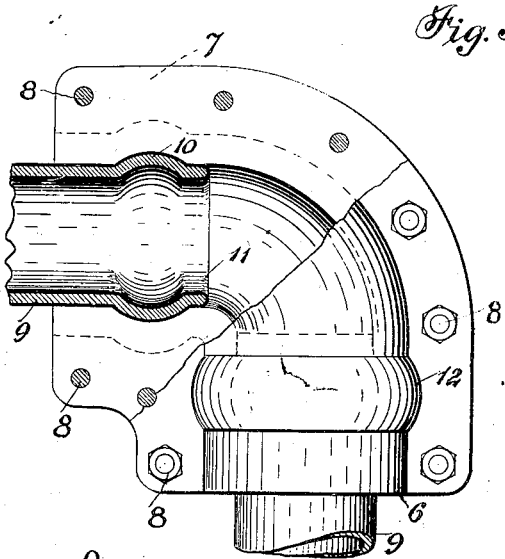
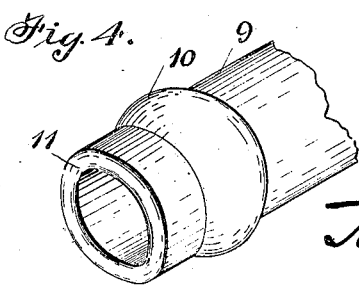

UNITED STATES PATENT OFFICE.

RAYMOND F. NAILLER, OF CLEVELAND, OHIO.

PIPE-COUPLING.

No. 881,022.

Specification of Letters Patent.

Patented March 3, 1908.

Application filed July 10, 1907. Serial No. 382,993.

*To all whom it may concern:*

Be it known that I, RAYMOND F. NAILLER, a citizen of the United States, residing at Cleveland, in the county of Cuyahoga and State of Ohio, have invented certain new and useful Improvements in Pipe-Coupling, of which the following is a specification.

This invention is a pipe coupling for enameled pipes. Such pipes are used in mines and other places where there is a likelihood of corrosive action or electrolysis on the pipe, and because the pipes are covered with enamel screw or threaded couplings cannot be used with advantage.

The object of the present invention is to provide a clamp coupling for such pipes, which will form a perfect joint, without the use of threads.

It is essential or desirable that the walls of enameled pipe be of uniform thickness throughout, because the enamel is baked on, and if the walls were not of uniform thickness the enamel would not be evenly burned. For instance, if the regular wall of a pipe were one-fourth of an inch thick, and there were a reinforcement on some portion of the pipe which made it one-half an inch thick, and such a pipe were put into the furnace, the thin part of the pipe would become red hot sooner than the reinforcement, which will result in the enamel on the thin portion being burned off, while the thick portion would not have reached a sufficient temperature to properly melt the enamel, and consequently the pipe would be poorly enameled or unserviceable. It is further desirable in coupling said pipes that they do not abut at the ends. This avoids abrasion due to vibration and also avoids electrolysis. If the ends of the pipe sections did abut, the natural vibration of any section of the pipe line would cause the two abutting ends to hammer or jaw together and grind, chip or scale off the enamel, thus distributing the insulation and making the pipe line a continuous conductor of electricity, and therefore cause electrolysis. Also, if the ends of the pipe sections should lose their enamel in consequence of the action indicated, the liquids flowing through the pipe would come in contact with the steel or other metal of which the pipe is made and allow chemical action to take place, and disturbing the usefulness of the pipe, inasmuch as said pipes are intended to be impervious to the action of acids or chemicals. In consequence of these considerations the invention herein described has been provided.

In the accompanying drawings, Figure 1 is a plan view illustrating the coupling. Fig. 2 is a cross section. Fig. 3 is a view partly in plan and partly in section of an L-coupling. Fig. 4 is a perspective view of the end of one of the pipes.

The coupling is made in half or symmetrical sections, each of which is indicated at 6, of semi-circular shape, and having at its opposite side edges flanges 7 which meet and are clamped together by bolts 8. The pipe sections are indicated at 9, and each section has near its end an expanded rib or bead 10, of larger diameter than the body of the pipe. The ends of the pipe are rounded as at 11, so that no sharp corners remain. The wall of each coupling section is similarly expanded or enlarged as at 12 to form on the inner side a recess in which the enlarged part 10 of the pipe fits. The ends 11 of the pipe sections do not abut, the construction being such that a space of a fraction of an inch is left between said ends. In order to insure a liquid and gas tight joint a packing 13 of rubber, asbestos, or other suitable material is placed between the pipe ends and the coupling, and when the bolts 8 are tightened the parts are drawn together and held in fixed position, the enlargement at the ends of the pipe fitting in the depressions in the coupling sections, serving to prevent any longitudinal movement of the parts.

It is to be understood that the pipe sections are enameled inside and out, and also that the coupling sections are enameled on all sides, for which reason the walls of the coupling sections are of the same thickness at all points. The space between the ends of the pipes prevents any fracture or disintegration of the enamel incident to vibration.

I claim:

In a coupling for enameled pipes, the combination with enameled pipe sections expanded near their ends to form ribs, the walls of the pipes and ribs being of the same thickness, of clamping sections which are the same thickness throughout and covered on all sides with enamel, and having inner circumferential recesses in which the ribs fit, and means to clamp the sections together, the ends of the pipe sections being spaced apart and the ends of the clamping sections being clamped upon the pipe sections on both sides of the ribs, to form a rigid coupling.

In testimony whereof I do affix my signature, in presence of two witnesses.

RAYMOND F. NAILLER.

Witnesses:
JOHN A. BOMMHARDT,
EDITH D. COMER.